Oct. 13, 1970     E. GASPERINI     3,533,222
DE-DUSTING DEVICE FOR SMOKE AND OTHER GASEOUS FLUIDS
Filed Aug. 31, 1966     5 Sheets-Sheet 5
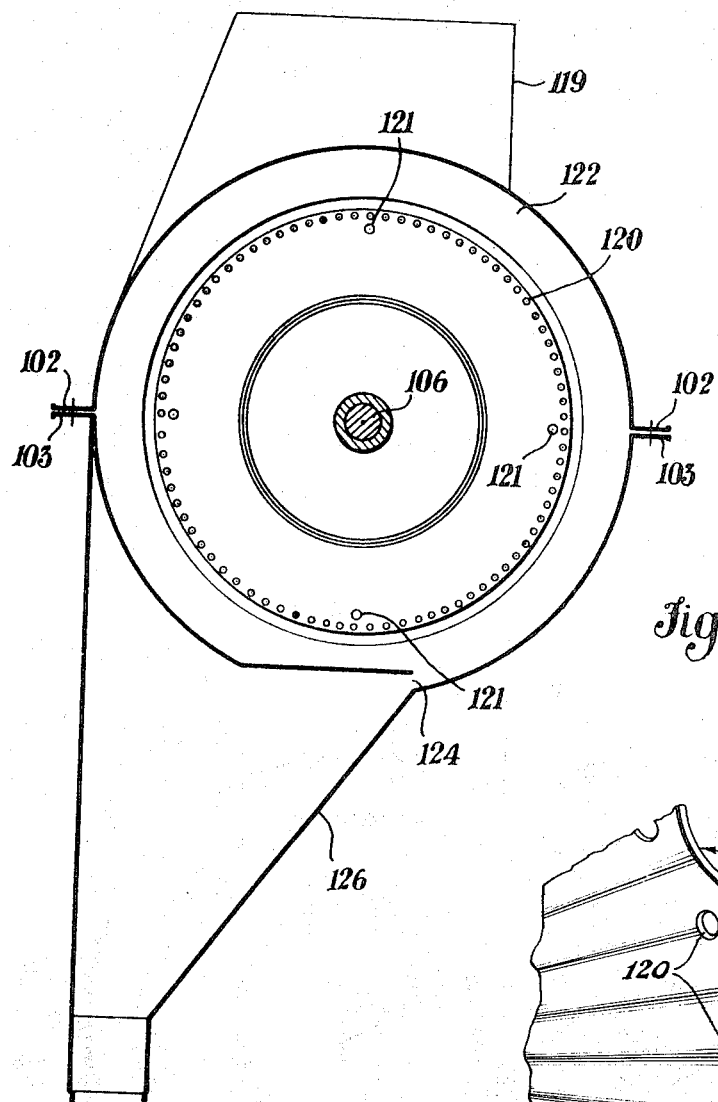
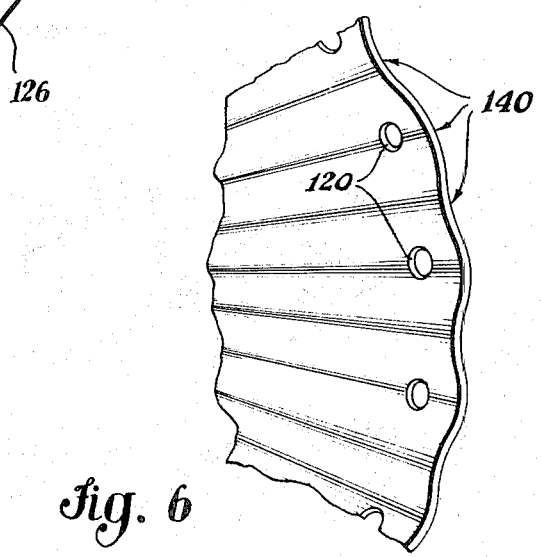
Enrico Gasperini, INVENTOR
BY Wenderoth, Lind and Ponack ATTORNEYS United States Patent Office 3,533,222
Patented Oct. 13, 1970

3,533,222
DE-DUSTING DEVICE FOR SMOKE AND
OTHER GASEOUS FLUIDS
Enrico Gasperini, Galbiate-Lecco, Italy, assignor to
Mediterranea Compagnia Industriale Commissionaria
e Commerciale S.p.A., Milan, Italy
Filed Aug. 31, 1966, Ser. No. 576,255
Claims priority, application Italy, Sept. 1, 1965,
22/231; July 5, 1966, 37/365
Int. Cl. B03c 3/00
U.S. Cl. 55—124
3 Claims

ABSTRACT OF THE DISCLOSURE

A de-dusting device having a casing of generally cylindrical shape with an inlet pipe for the smoke to be de-dusted and an outlet pipe for the de-dusted smoke. A rotatable shaft is centrally mounted lengthwise within the casing with bearing means at the side walls of the casing for supporting the shaft. A support is secured outside of a side wall with a motive unit mounted on said support. A coupling means for coupling the shaft to said motive unit. Rotary means are arranged on the shaft and annular deflectors are secured to the inner wall of the casing to form with the casing a sequence of cylindrical chambers communicating with one another. Collection receptacles are provided at the lower portion of the casing for each chamber. Suction fans are arranged on the shaft near the inlet and the outlet. An electrostatic precipitator-discharger unit is arranged within the inlet pipe for discharging the electrostatic charges of the particles carried by the smoke consisting of a plurality of grids electrically insulated from one another and connected each to two terminals of a high voltage source, said grids being arranged one above another. The second grid, beginning from the first one, has a plurality of point shaped projections turned towards the underlying grid. The rotary means are provided at their marginal portion with discontinuities, consising of a circular row of holes and of corrugations at the outer edge of the rotary means to create a mechanical action having a frequency adjacent the supersonic frequency of sound waves.

The present invention relates to an improved device for de-dusting smoke, or for removing particles carried by gaseous fluids. Said device can be particularly used for de-dusting smoke produced by combustion.

The purpose of the present invention is that of providing a device capable of removing from smoke solid particles in said smoke and collecting said particles within suitable receptacles.

According to the present invention, the smoke de-dusting device includes a casing having a generally cylindrical shape provided with an inlet fitting for the smoke to be de-dusted, an exhaust fitting for the de-dusted smoke, a rotatable shaft located lengthwise within said casing and provided with discs located therein near annular deflectors defining a sequence of cylindrical chambers communicating with each other. The cylindrical shaped casing is provided at its end opposite to the smoke inlet end with a suction fan for delivering the smoke towards an exhaust fitting. The casing has an electrostatic precipitator-discharger mounted in the inlet fitting.

Figure 1:
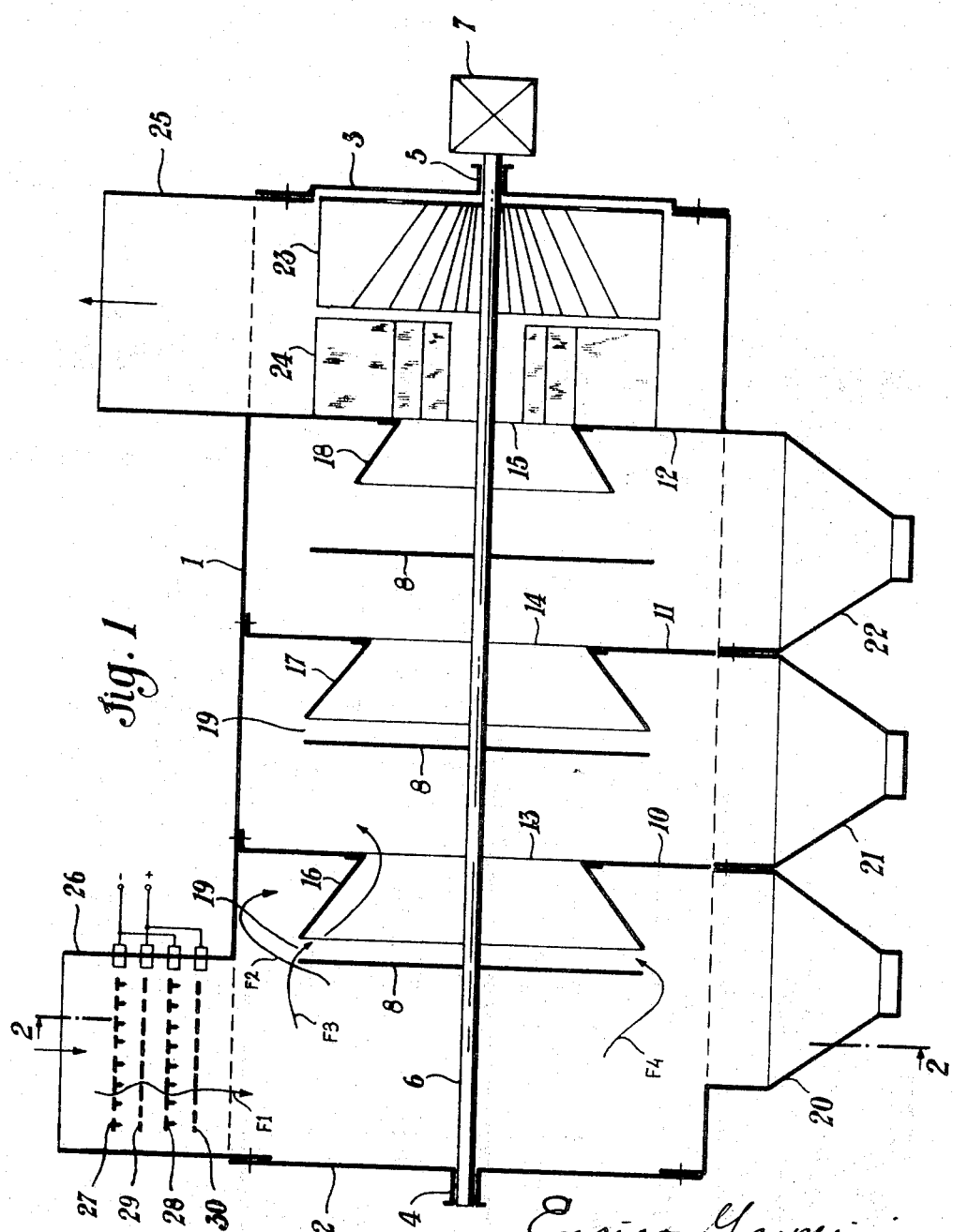
Figure 2:
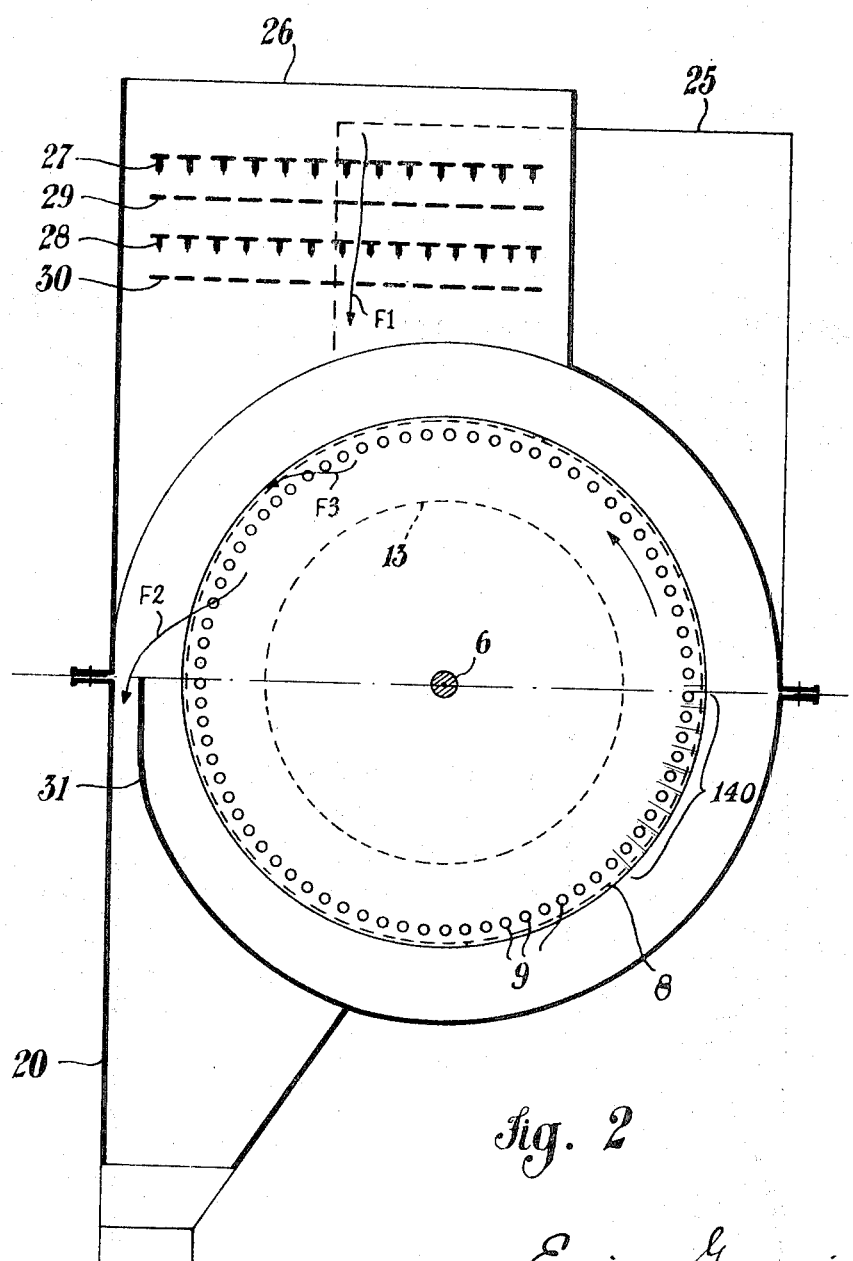
Figure 3:
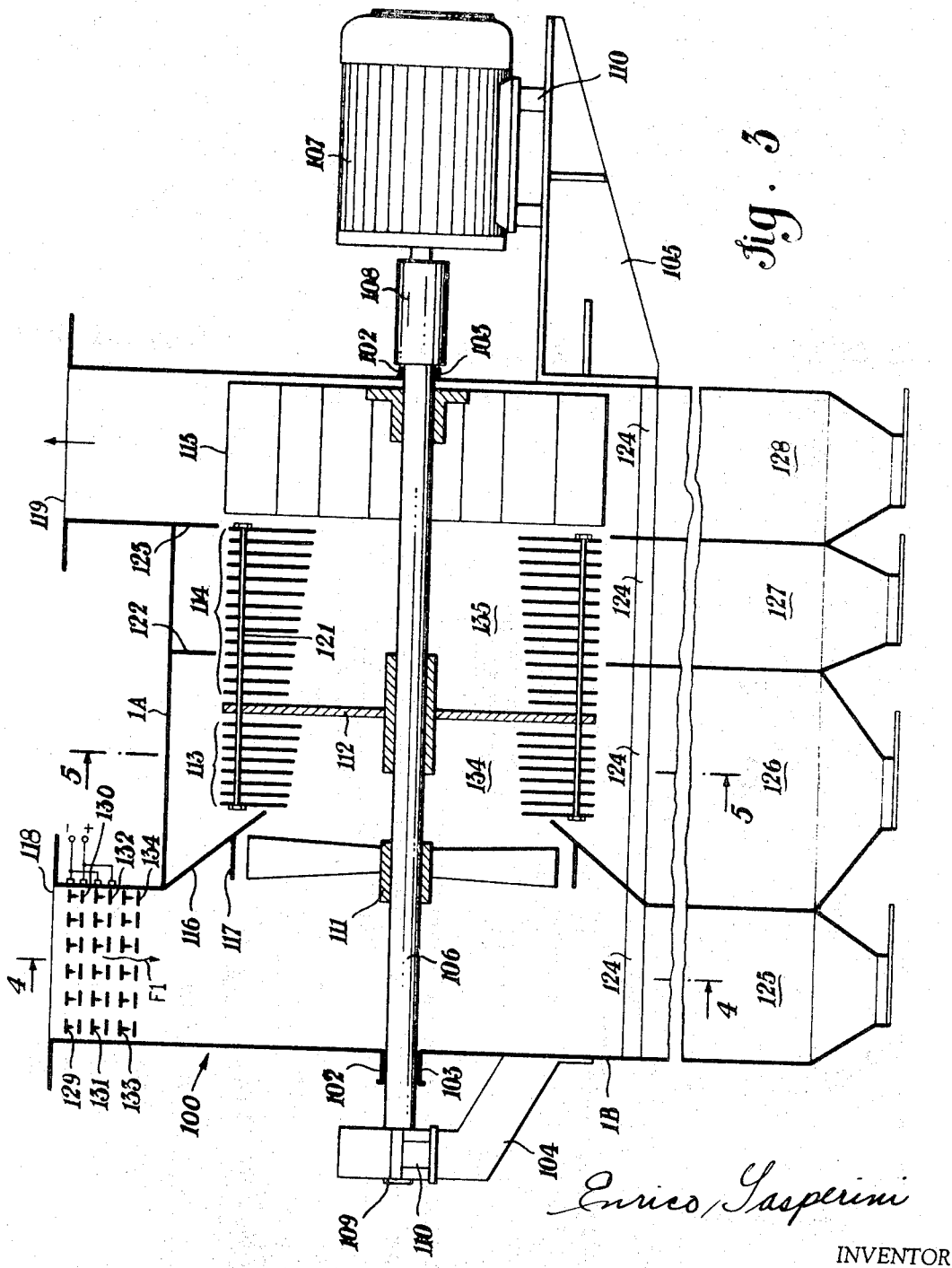
Figure 4:
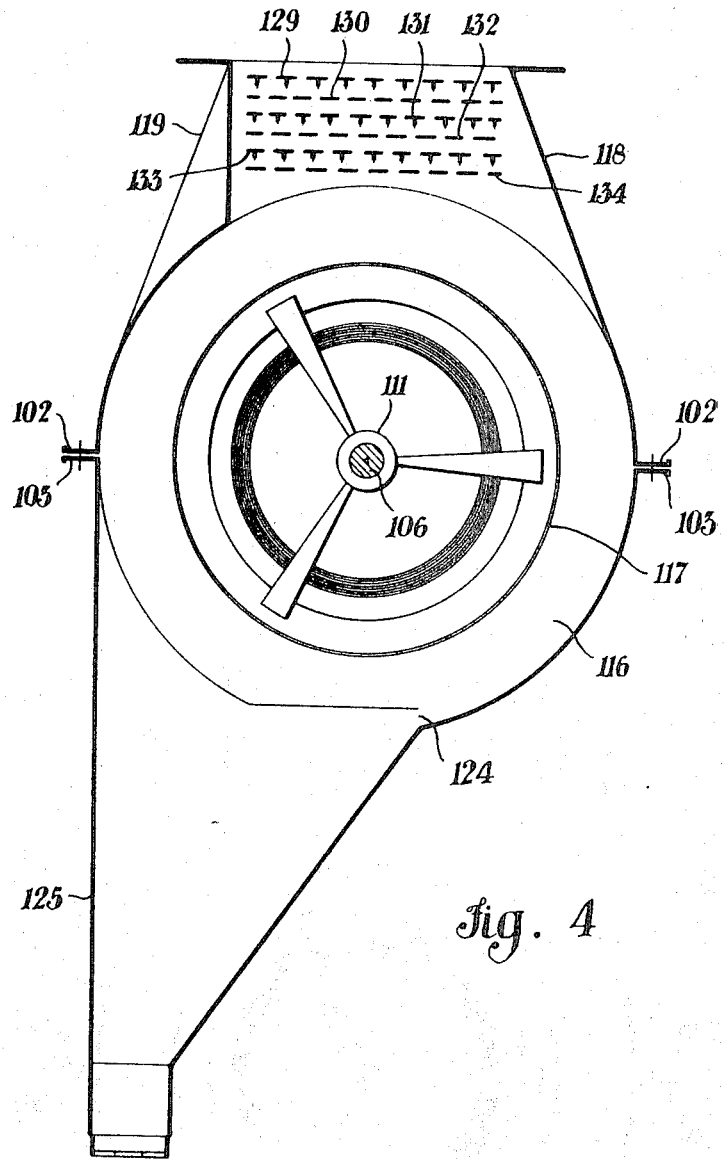

The present invention will be now described with reference to two embodiments thereof, disclosed only by way of non limitative example, and with respect to the attached drawings, wherein:

FIG. 1 shows a longitudinal sectional view of a first embodiment of the smoke de-dusting device according to this invention, and FIG. 2 shows a cross sectional view taken along the line 2—2 of FIG. 1, FIG. 3 shows a longitudinal sectional view of the fluid and powder de-dusting device, in a second embodiment thereof, FIG. 4 shows a cross sectional view taken along the plane 4—4 of FIG. 3, FIG. 5 shows a cross sectional view taken along the plane 5—5 of FIG. 3, FIG. 6 shows a fragmentary perspective detail of the outer edge of the coaxial rings.

With reference to the drawings, the smoke de-duster separator includes a cylindrical body 1, provided with closing flanges or side walls at its ends shown at 2 and 3. The flanges 2 and 3 are provided with bearings 4 and 5 in order to support rotatably a shaft 6 rotated by a motive unit 7.

A rotary means comprising a plurality of discs 8 are fastened to the shaft 6. On said discs a sequence of discontinuities is embodied along a circumference near to their edges, as shown by way of example, in form of a circular row of holes 9. The cylindrical body 1 of the de-duster is subdivided into intercommunicating chambers by the partition walls shown in 10, 11 and 12, provided with the central apertures 13, 14 and 15, respectively, to which are connected the deflectors or screens 16, 17 and 18 having a frusto-conical shape, the greatest diametered part of which is turned towards the associated discs 8.

The discs 8 are spaced apart as shown at 19 from the deflectors 16, 17 through a clearance of about 10 mm.

The body 1 of the de-duster is, further, connected to the receptacles 20, 21 and 22 for collecting the particles suspended in the smoke of other gaseous fluid, said particles being separated by the device from smoke passing therethrough.

On the shaft 6 is also mounted a fan 23 which together with the directing blades 24 serves the purpose of sucking the smoke or other gaseous fluid through the de-duster, in order to deliver it towards the exhaust duct 25. Within the inlet duct 26, for the smoke to be de-dusted, an electrostatic precipitator discharger is mounted, consisting of the grids 27, 28, 29, 30, connected to the two terminals of a high voltage source respectively. Said high voltage can be either a direct voltage with the indicated polarities, or an alternating voltage.

If a direct high voltage will be used, the first set of grids 27 and 28 are provided with points turned toward the grids 29 and 30, respectively. The grids 29 and 30 form a second set of grid.

The electrostatic precipitator discharger unit consisting of the grids 27, 28, 29 and 30 is used for discharging the electrostatic charges present on the particles carried by the smoke, said charges taking a remarkable importance when the smoke has a high temperature, due to the fact that the repulsive electric forces prevent the agglomeration thereof from taking place.

During the operation of the smoke de-duster device, the smoke enters through the inlet duct 26 and then passes through the precipitator-discharger, following the path as shown by arrow F1.

The smoke is then sucked towards the space 19 between the disc 8 and the deflector 16 and here is submitted to centrifuging action by the high speed rotating disc 8 and to a mechanical action generated by the holes or discontinuities 9 of the disc 8. The gas, thrown towards the periphery of the disc 8 due to the action of the centrifugal force move along the deflector 31 along the path of the arrows F2 (FIG. 2) and the particles carried by the smoke are thrown against the wall of the cylinder 1, dropping then towards the receptacles 20, 21 and 22. The remaining part of the smoke passes, as shown by the arrows F3 and F4 beyond the deflector 16 towards the other de-dusting and separating sections of the device.

Either the number of the discontinuities or holes 9 of the rotating discs, or their speed of rotation are selected so as to obtain in the treated gaseous mass the generation of high frequency sound waves with a frequency at the upper limit of the band of the heard frequencies.

It has been found that this frequency automatically adjusts with the change of the density of the smoke depending upon their temperature, with a consequent change of the speed of rotation of the fan.

The smoke, after its passage through the remaining part of the apparatus, where it is submitted to the same actions as hereinbefore described, will be sucked by the fan 23 and delivered towards the exhaust duct 25.

By the de-duster apparatus according to the present invention, an effective separation of the particles suspended in the smoke will be obtained, and also a classification of the particles in the various receptacles will be obtained according to the sizes of the particles and their density.

This invention will be now described with reference to a second embodiment thereof.

With reference to the drawing, the de-duster comprises a cylindrical body 100 consisting of two semi-cylinders, the upper semi-cylinder 1A and the lower semi-cylinder 1B, each provided with a shutting flange 102 and 103 providing to the connection of the two bodies.

A semicylindrical body 1A is provided with a fitting for the inlet of the fluids to be de-dusted and with a fitting 119 for the exhaust of the de-dusted fluids.

The semicylindrical body 1B is provided at its lateral ends or side walls with the supports 104 and 105 preferably outside of the device in order to rotatably support a shaft 106 which is rotated by a motive unit 107.

The shaft 106 is directly connected to the motive unit 107 by means of a rigid joint or coupling means 108 and at its other end it is supported by a ball bearing 109.

Both the motive unit 107 and the ball bearing 109 (the latter being received in a suitable carrier) elastically rest on their associated supports through the antivibration devices 110.

On the shaft 106 are mounted: either an axial fan, or more blades 111, a disc 112 supporting two sets of coaxial annular disc rings 113 and 114, a centrifugal fan 115.

The preferably circular support disc 112, with its two sets of coaxial rings 113 and 114 form a single rotating block which is fixed to the shaft 106 by means of a sleeve whereon the disc 112 is suitably fixed. The first set of said rings 113 consists of a group of rings (in the drawing in number of 8) the outer diameter of said rings is constant, while their inner diameter decreases as they approach nearer to the disc 112.

The distance between the rings and the last ring and the disc 112 is constant and is secured by suitable spacers. Also the second set of rings 114 consists of a group of coaxial rings (in the drawing in number of 14) the outer diameter of which is constant and equal to that of the first set of rings 113 and of the disc 112, while the inner diameter changes decreasingly as the rings are progressively spaced away from the disc 112. The distance between the disc 112 and the first ring of the set 114, and between the rings in the set 114 is constant and equal to the distance in the set 113; also in this case said distance is obtained by means of spacers.

On the rings a set of discontinuities is embodied along a circumference near to the edge, shown by way of example in the form of a circular row of holes 120. Furthermore, the edges of said rings are undulated or corrugated as shown generally at 140 and partially in the bracketed area of FIG. 2, FIG. 5 and in greater detail in FIG. 6 of the attached drawings.

The unit of the rings (sets 113 and 114) and the disc are fastened by means of preferably four or more through tie rods located on a circle near to the edge but at a lesser radial distance from shaft 106 than are the set of discontinuities 120.

The casing or cylindrical body 101 (consisting of 1A and 1B), is subdivided into intercommunicating chambers by means of partition walls shown by 116, 122 and 123, which are provided with respective central apertures. The wall 116 having a frusto-conical shape with its apex turned towards the rings, carries the cylindrical shield 117 which defines the working field of the axial fan 111.

Each intercommunicating chamber (in the drawing in number of four) is provided at its base with a slot 124 the length of which equals the length of the chamber itself, while the height is about 10–20 mm.

These slots communicate with collecting receptacles for the dust, soot, or powder, 125, 126, 127, 128. The receptacles are the collecting chambers and do not communicate with one another and are located at the base along the whole length of the semicasing 1B.

Said receptacles have a tapered end and are provided with gates for their exhaustion.

In the inlet duct 118 for the fluid to be de-dusted, an electrostatic precipitator discharger is located, consisting of four or more grids, denoted in the drawings by 129, 130, 131, 132, 133, connected to the two terminals of a high voltage source, respectively. Said high voltage can be either a direct voltage with the indicated polarities, or also alternating current can be used. The electrostatic discharger unit consisting of the grids 129, 130, 131, 132, 133 is used to discharge the electrostatic charges present on the particles carried by the fluid, said charges assuming a remarkable importance when the smoke has a high temperature, due to the fact that the electric repulsive forces prevent the agglomeration of said particles.

During the operation of the fluid de-duster device, said fluid enters from the duct of the inlet 118 and passes through the discharger-precipitator (being submitted to the described effects) following the path as shown by the arrow F1.

The fluid is then sucked by the axial fan 111 which imparts a first rotatory movement to said fluid. The heavier particles contained within the fluid, due to the centrifugal force, even if limited, enter into the slot communicating with the receptacle 125 and therein will be deposited.

The fluid sucked by the axial fan 111 will be thrown into the chamber 134 defined by the first set 113 of said rings and by the disc 112, and is progressively centrifuged by these rings and also submitted to a mechanical action at a high frequency generated by the holes or discontinuities 120 of the rings 113. This action allows the agglomeration of the solid particles suspended in the fluid rendering said agglomerates more sensitive to the centrifuging action.

The fluid is compelled to pass through the spaces defined by the surfaces of the rings and the particles are submitted thereby to a strong tangential thrust which compels said particles to enter into the slot corresponding to the receptacle 126.

The fluid due to the residual thrust effect imparted by the axial fan 111, and due to the suction action of the centrifugal fan 115 moves near to the edge of the first sector of the second ring set 114 between support disc 112 and the deflector 122.

The particles are still submitted to the centrifuging action of this sector of the set 114 and the particles still drop into the collector 126.

Due to the sudden obstruction of the passage area for the fluids by the deflector 122, the fluid is compelled to enter through the spaces between the rings into the chamber 135, and under the action of the centrifugal force only the infinitely little particles are capable of overcoming the tangential thrust which is directed towards the slot communicating with the collector. Most of the particles contained in the fluid, entered into the chamber 135, are submitted to the centrifuging effects caused by the remaining section of the ring set 114, particularly in view of the fact that the inner decreasing diameter of said rings decreases as the fluid approaches fan 115, which offers progressively increasing rotating surface to the fluid.

The particles which are submitted to such an effect are projected outwards and enter into the slot corresponding to the receptacle 127. The fluid sucked by the centrifugal fan 115 rotates within the volute and the particles therein contained enter into the receptacle 128, through the corresponding slot.

The de-dusted fluid will be delivered through an outlet duct 119.

I claim:

1. A de-duster device for smoke and other gaseous fluids comprising a casing of a generally cylindrical shape having an inlet for the smoke to be de-dusted and an outlet for the de-dusted smoke, said casing having side walls at the ends thereof; a rotatable shaft centrally mounted within said casing lengthwise thereof; bearing means at said side walls of said casing and supporting said shaft; a motive unit and means supporting it adjacent a side wall of said casing; coupling means for coupling said shaft to said motive unit; rotary means comprising a plurality of devices arranged on said shaft; annular deflectors secured to the inner wall of said casing defining with said casing a sequence of cylindrical chambers communicating with one another; at least one disc disposed in at least one of said chambers; collection receptacles provided at the lower portion of said casing for at least each chamber having a disc therein; a suction fan arranged on said shaft to draw the smoke from said inlet towards said outlet; an electrostatic-precipitator-discharger unit arranged within said inlet and comprising a plurality of grids electrically insulated from one another to define two sets of grids connectable with a high voltage source having a positive terminal and a negative terminal; one set of said grids being connectable to one of said terminals and the other set of said grids being connectable to the other of said terminals; said grids being arranged one above another and each second grid, beginning from the first one, defining said first set of grids, having a plurality of point shaped projections turned towards the underlying grid; said rotary means having at their marginal portion discontinuities consisting of a circular row of holes and corrugations at the edges of said rotary means.

2. A de-duster device as defined in claim 1, wherein said plurality of circular discs are arranged with one of said discs in each of said plurality of chambers; a plurality of frusto-conical annular screens, one each of said screens fastened around said shaft to a respective one of said deflectors; the larger aperture of said screens being turned towards its corresponding disc; and said fan being arranged at said output for de-dusted smoke.

3. A de-duster device as defined in claim 1, wherein said plurality of discs includes a circular disc supporting a set of coaxial annular disc rings at each side thereof; said annular disc rings being secured to said support disc by a plurality of tie rods arranged in a circle around said shaft; the first set of said rings having an inner diameter decreasing towards said support disc and the second set of said rings having an inner diameter increasing towards said support disc, with the outer diameter of said annular disc rings being constant; spacer means for maintaining a substantially constant distance between each of said rings and said support disc; said fan being arranged near said inlet for smoke to be de-dusted; a first deflector of said plurality of deflectors having a frustoconical shape inclined towards said rings, a cylindrical shield being fastened to said first deflector around said fan; and a second fan of the centrifugal type secured to said shaft near said outlet.

References Cited

UNITED STATES PATENTS

| | | | |
|---|---|---|---|
| 1,342,651 | 6/1920 | Squires | 55—152 X |
| 1,760,623 | 5/1930 | Aurig | 261—83 |
| 1,867,809 | 7/1932 | Chase. | |
| 1,873,336 | 8/1932 | Schmidt | 230—120 |
| 2,087,834 | 7/1937 | Brown et al. | 103—115 |
| 2,289,474 | 7/1942 | Anderson | 55—401 X |
| 2,431,336 | 11/1947 | Lincoln | 55—401 |
| 2,500,008 | 3/1950 | Richardson | 204—154 |
| 1,035,422 | 8/1912 | Cottrell et al. | 55—148 X |
| 1,562,118 | 11/1925 | Moscovitch | 55—400 X |
| 1,803,462 | 5/1931 | Crago et al. | 55—400 X |
| 2,031,734 | 2/1936 | Riebel et al. | 55—408 X |
| 2,336,476 | 12/1943 | Fulcher. | |
| 2,758,666 | 8/1956 | Preatiss | 55—124 X |
| 3,257,779 | 6/1966 | Strubler | 55—124 X |

FOREIGN PATENTS

| | | |
|---|---|---|
| 341,221 | 9/1921 | Germany. |
| 84,338 | 6/1921 | Austria. |
| 190,463 | 5/1888 | France. |
| 530,674 | 12/1921 | France. |
| 559,834 | 6/1923 | France. |
| 665,401 | 5/1929 | France. |
| 241,179 | 11/1911 | Germany. |
| 698,319 | 11/1940 | Germany. |
| 29,178 | 1904 | Great Britain. |
| 780,986 | 8/1957 | Great Britain. |
| 271,642 | 2/1961 | Switzerland. |
| 279,901 | 4/1952 | Switzerland. |
| 119,429 | 4/1958 | U.S.S.R. |

DENNIS E. TALBERT, JR., Primary Examiner

U.S. Cl. X.R.

55—131, 152, 277, 319, 394, 403, 408, 426, 472, 473; 209—7, 135